(No Model.) 2 Sheets—Sheet 1.

A. B. SMITH.
MACHINE FOR MOLDING CHEESE.

No. 302,042. Patented July 15, 1884.

Witnesses:
Theo. L. Popp
Chas. J. Buckheit

Inventor:
A. B. Smith
By Wilhelm & Bonner,
Attorneys.

UNITED STATES PATENT OFFICE.

AUGUSTUS B. SMITH, OF CHESTER, NEW YORK, ASSIGNOR TO WILLIAM A. LAWRENCE, OF SAME PLACE.

MACHINE FOR MOLDING CHEESE.

SPECIFICATION forming part of Letters Patent No. 302,042, dated July 15, 1884.

Application filed August 11, 1883. (No model.)

*To all whom it may concern:*

Be it known that I, AUGUSTUS B. SMITH, of Chester, in the county of Orange and State of New York, have invented new and useful Improvements in Machines for Molding Cheese, of which the following is a specification.

The object of this invention is to produce a simple machine for molding the small cheeses known to the trade as "Neufchatel cheese." These cheeses are in form cylindrical, with flat ends, and have heretofore been molded by hand. My improved machine is designed to mold these cheeses more rapidly than they can be produced by hand.

My invention consists to that end of the novel construction of the molding-machine, which will be hereinafter fully set forth, and pointed out in the claims.

Figure 1:
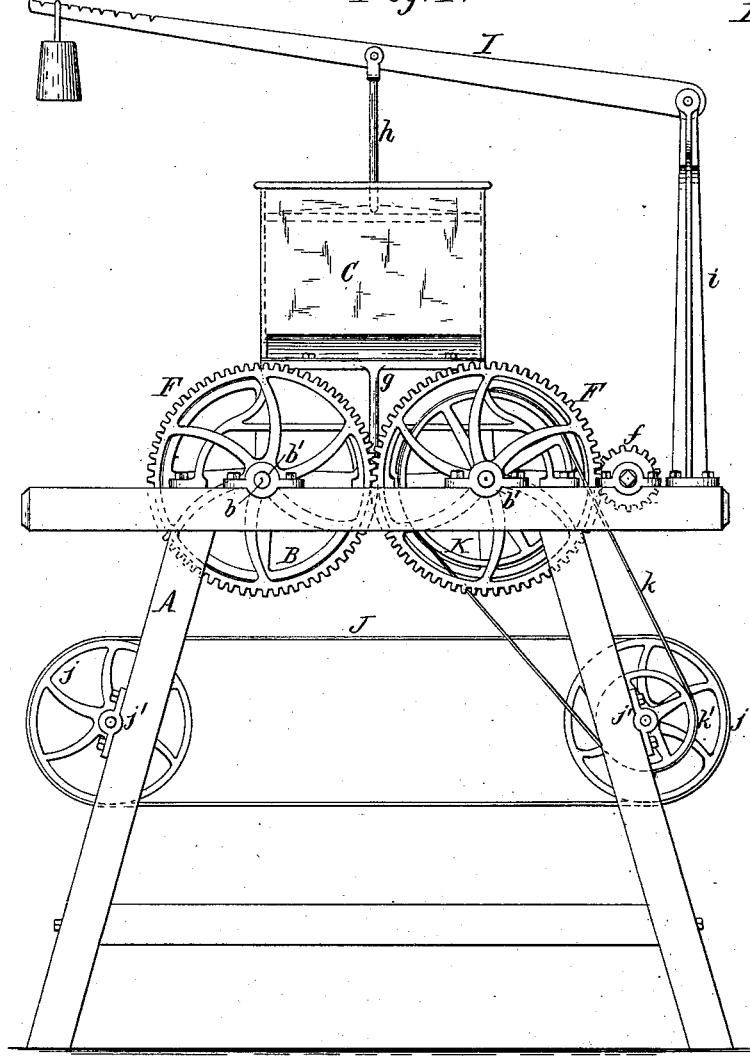
Figure 2:
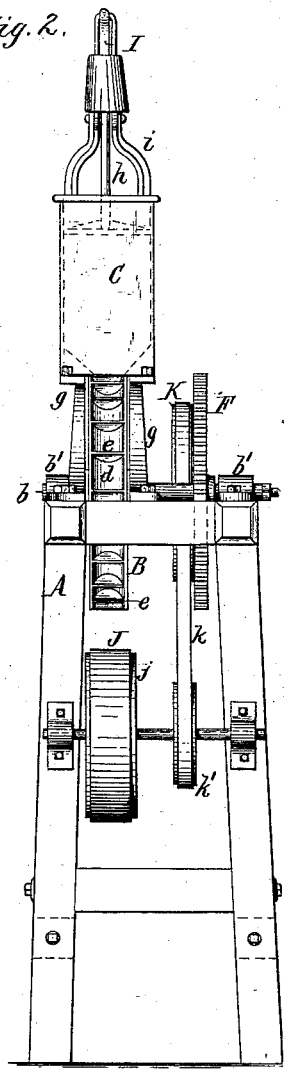
Figure 3:
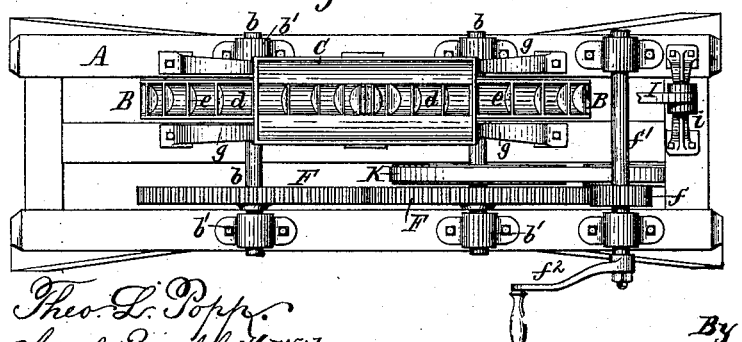
Figure 4:
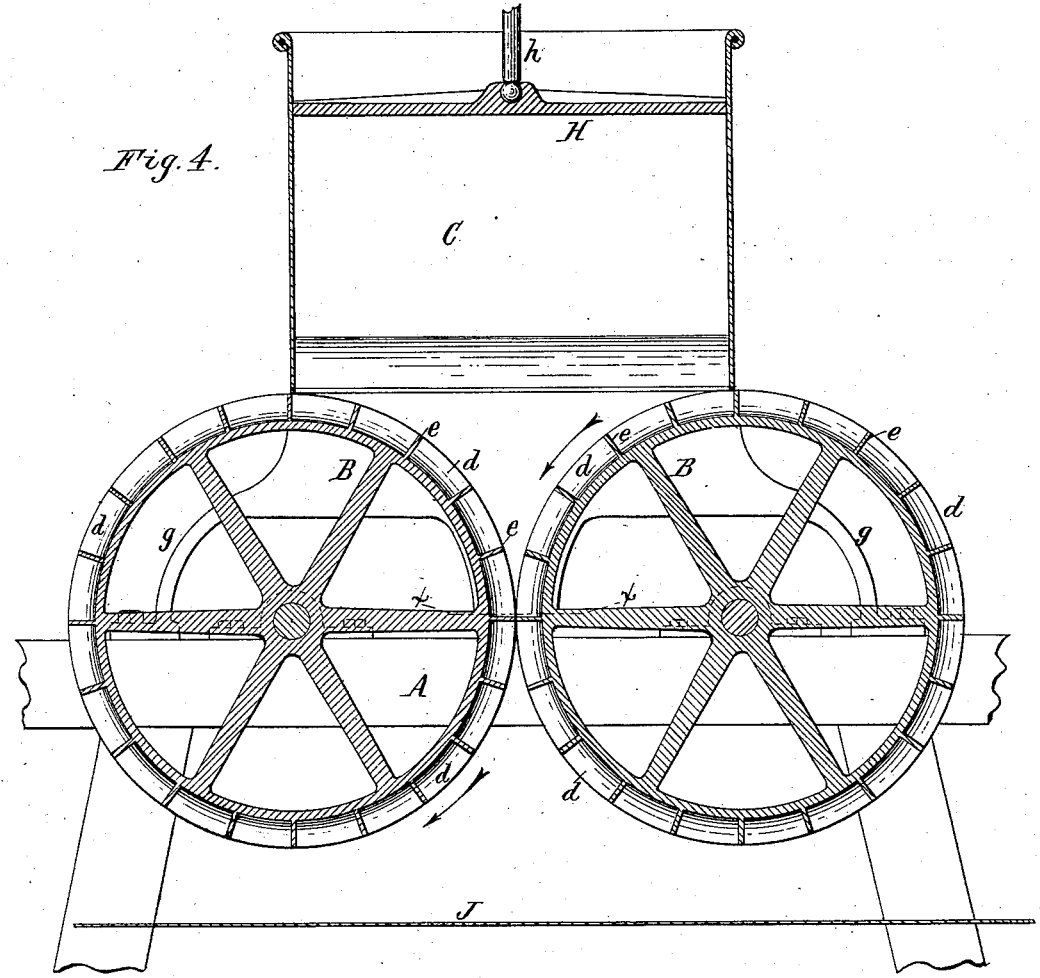
Figure 5:
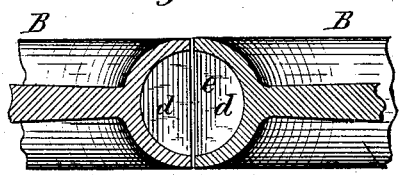
Figure 6:
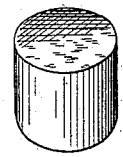

In the accompanying drawings, consisting of two sheets, Figure 1 is a side elevation, and Fig. 2 an end elevation, of my improved molding-machine. Fig. 3 is a top plan view with the feed-box removed. Fig. 4 is a vertical section of the molding-wheels and feed-hopper on an enlarged scale. Fig. 5 is a horizontal section in line $x\ x$, Fig. 4. Fig. 6 is a perspective view of a cheese molded by my improved machine.

Like letters of reference refer to like parts in the several figures.

A represents the stationary frame of the machine.

B B represent two molding-wheels, having their shafts $b$ supported in bearings $b'$, secured to the frame A.

C is the feed-box or curd-hopper, arranged above the wheels B B. The wheels B B are provided in their peripheries or faces with depressions or concave molds $d$, each adapted to receive and mold one-half of the cheese to be molded, the two molds standing opposite each other on the faces of the wheels B, forming together a complete divided mold for a cylindrical cheese, such as is represented in Fig. 6. The several molds $d$ on the same wheel are separated by partitions $e$, which register with each other on the faces of the two wheels. The latter are rotated with equal speed by two gear-wheels, F F, secured to the shaft $b$. These gear-wheels also maintain the proper relative position of the molds on the two wheels. Motion is imparted to one of the gear-wheels F by a pinion, $f$, secured to a counter-shaft, $f'$, which latter may be rotated by a hand-crank, $f^2$, or by an endless belt and driving-pulley, or other suitable means. The feed-box C is arranged above the upper and inner portions of the wheels B, and extends downwardly on both sides of the wheels, the latter forming the bottom of the feed-box, and supporting the curd contained in the latter. The feed-box is supported upon the frame A by standards $g$.

H represents a follower, which rests upon the curd in the feed-box, and which presses the curd downward in the feed-box and against the upper sides of the molding-wheels B. The follower H is connected by a rod, $h$, with a weighted lever, I, which latter is pivoted to a standard, $i$, supported on the frame A. The weighted lever I tends to move the follower H downwardly in the feed-box. If preferred, the follower may be actuated by a screw driven from the molding-wheels, so as to move the follower at a certain speed proportionate to the quantity of curd removed from the feed-box by the molding-wheels, or by any other suitable means.

J represents an endless horizontal apron running around pulleys $j\ j$, the shafts of which turn in bearings $j'$, secured to the frame A. The apron J is rotated by an endless belt, $k$, running around a pulley, K, secured to the shaft $b$ of one of the molding-wheels, and around a pulley, $k'$, secured to the shaft of one of the pulleys $j$. The apron J is arranged below the wheels B to receive the molded cheeses as they are discharged from the wheels, and convey them to a convenient place, where they are received by the operator.

The curd to be molded into cheeses is placed in the feed-box C, and the follower H is placed on the curd. The machine is now ready for operation. Upon turning the molding-wheels B in the direction of the arrows in Fig. 4, the curd fills the molds $d$ on the upper and inner sides of the wheels, and as the molds approach each other in passing downward on the working sides of the wheels the curd is pressed into the half-molds on the faces of both wheels until the point of closest contact between the two molding-wheels is reached, where the curd receives the final pressure and is molded into a cylindrical cheese between the two half-cylindrical molds standing opposite each other. On the lower sides of the wheels the two half-molds on the two wheels, between which the cheese has been molded, separate and permit the cheese to drop on the apron J. The molded cheeses are discharged by the wheels B B in rapid succession, and the apron J is moved with sufficient speed to remove one cheese from below the point of delivery before the next cheese is discharged. The cheeses molded, as hereinbefore described, are then wrapped in paper and tin-foil, in the usual manner. In order to prevent the cheese from adhering to the molds, the latter are preferably sprinkled with salt.

I claim as my invention—

1. In a machine for molding cylindrical cheese, the combination of two revolving molding-wheels provided on their faces with semi-cylindrical half-molds which constitute cylindrical molds at the contiguous portions of the wheels, and a curd-hopper arranged above the contiguous faces of the wheels, whereby the curd is caused to flow into and fill the molds, substantially as set forth.

2. In a machine for molding cylindrical cheese, the combination of two revolving molding-wheels provided on their faces with semi-cylindrical half-molds which constitute cylindrical molds at the contiguous portions of the wheels, a curd-hopper arranged above the contiguous faces of the wheels, whereby the curd is caused to flow into and fill the molds, and an endless traveling apron arranged below the contiguous faces of said wheels, for the reception of the molded cheese, substantially as set forth.

3. In a machine for molding cheese, the combination of two molding-wheels provided on their faces with depressed molds, a curd-receptacle arranged above said wheels, and a pressure mechanism whereby the curd is forced downwardly through the curd-receptacle and upon the molding-wheels, substantially as set forth.

Witness my hand this 3d day of August, 1883.

AUGUSTUS B. SMITH.

Witnesses:
FRANK DURLAND,
JOSEPH DURLAND.